United States Patent [19]

Bahder et al.

[11] 3,821,640

[45] June 28, 1974

[54] METHOD AND APPARATUS FOR ACCELERATED TESTING OF POWER CABLE INSULATION FOR SUSCEPTIBILITY TO TREEING

[75] Inventors: George Bahder, Suffern; Carlos Katz, Spring Valley, both of N.Y.

[73] Assignee: Phelps Dodge Industries, Inc., New York, N.Y.

[22] Filed: Apr. 16, 1973

[21] Appl. No.: 351,380

[52] U.S. Cl. .............................................. 324/54
[51] Int. Cl. ........................................ G01r 31/12
[58] Field of Search ..................................... 324/54

[56] References Cited
UNITED STATES PATENTS

| | | | |
|---|---|---|---|
| 2,192,286 | 3/1940 | Galbraith et al. | 324/54 |
| 2,452,624 | 11/1948 | Zimmermann | 324/54 |
| 2,704,825 | 3/1955 | Martin et al. | 324/54 |

FOREIGN PATENTS OR APPLICATIONS

| 888,443 | 1/1962 | Great Britain | 324/54 |
|---|---|---|---|

OTHER PUBLICATIONS

Rylander, J. L., Testing Insulation with High Frequency, Reprint 317, from The Electric Journal of Jan. 1928, pp. 1-4.

Rushton, E., Tracking Currents in Insulating Materials, Chemistry and Industry, Sept. 16, 1944, pp. 332, 333.

*Primary Examiner*—Gerard R. Strecker
*Attorney, Agent, or Firm*—Davis, Hoxie, Faithfull & Hapgood

[57] ABSTRACT

Extruded power cable insulation is tested for susceptibility to gradual electro-chemical deterioration (electro-chemical treeing) by wetting at least a portion of the insulation of a sample of the cable with a selected liquid wetting agent and applying a high frequency, high voltage alternating current signal across the wetted portion of the insulation. During testing the conductor of the test sample may be heated to approximately its normal operating temperature. The cable sample may also be mechanically stressed during the test if desired. Trees develop in considerably less time than is required under normal operating conditions.

27 Claims, 3 Drawing Figures

METHOD AND APPARATUS FOR ACCELERATED TESTING OF POWER CABLE INSULATION FOR SUSCEPTIBILITY TO TREEING

BACKGROUND OF THE INVENTION

This invention relates to the testing of electrical power cables and, more particularly, to methods and apparatus for accelerated testing of the extruded insulation of power cables for susceptibility to failure of the type known as treeing.

Solid dielectric insulated cables are subject to several forms of deterioration during in-field service which can eventually lead to cable breakdown. One of these forms of deterioration is known as treeing, i.e., the formation of microscopic patterns of weakened material in the cable insulation. In general, two types of trees may be identified in solid type insulation: electrical type and electro-chemical type. The electrical type is originated by partial electrical discharge (i.e., corona discharge) and it has a very short life. Once it starts to develop, it leads almost immediately to cable breakdown. Electrochemical trees, on the other hand, appear to be caused by penetration of liquids into the insulation in a tree-like pattern under the influence of an electrical potential. This process is relatively slow and may last for several months or several years. Eventually the electrochemical type tree becomes an electrical type tree, thereby causing premature cable failure. In severe cases of deterioration, the cable will fail after only a few months of service, with consequent blackout and loss of electric power supply to the consumer. This invention is primarily concerned with testing cable insulation for susceptibility to electro-chemical treeing, and it will be understood that, unless otherwise specified, the term treeing as used herein refers to electro-chemical type treeing.

As mentioned above, electro-chemical trees appear to develop as a consequence of the combined presence of liquids and electric stress. Particularly in polyethylene and cross-linked polyethylene insulated cables, moisture, sometimes involving a chemical reaction, penetrates into the insulation, causing penetration-type trees. When liquid penetrates into the insulation of the cable, it can create conditions under which a tree may also grow from contaminants. The tree from contaminants is probably a diffusion of the contaminant material into the insulation, accelerated by the presence of the liquid. Viewed through a microscope, some trees look like dendrites, others like streamers, bow ties, or broccoli, etc. Trees may start at the cable conductor or conductor shield and extend radially outward into the insulation; they may start at the insulation shield (if there is one) and extend inward; or they may start at contaminants and simultaneously extend inward and outward.

Depending on insulation quality and cable construction, the development of trees throughout the entire insulation wall thickness during in-service cable operation may take from a few months to several years. Properly manufactured cables are not susceptible to the development of trees and consequently enjoy a tree-free life. Both the manufacturers and users of cable are interested in determining the propensity of cables to develop trees to minimize field installation of cables in which trees will develop. However, it is rarely practical to test cables for treeing under actual operating conditions, particularly in view of the length of time typically required for trees to form under such conditions.

It is therefore an object of this invention to provide an accelerated method of testing cables for susceptibility to treeing.

It is another object of this invention to provide apparatus for carrying out the method of this invention.

SUMMARY OF THE INVENTION

These and other objects of the invention are accomplished in accordance with the principles of the invention by wetting at least a portion of the insulation of a cable test sample with a selected liquid wetting agent (preferably, but not necessarily, a high dipole liquid) and applying a high frequency, high voltage alternating current electrical signal across the wetted portion of the insulation. During testing the conductor of the test sample may be heated to approximately its normal operating temperature. If desired, the cable test sample may also be bent in a U-shape during the test period to stress the cable components to a predetermined degree.

After a predetermined interval of accelerated testing as described above, the test sample is examined for the presence of trees, e.g., by microscopic inspection of one or more cross sections of the sample.

The principles of this invention are equally applicable to testing the insulation of insulated wire or any other type of insulated conductor for susceptibility to treeing.

Further features and objects of the invention, its nature and various advantages will be more apparent upon consideration of the attached drawing and the following detailed description of the invention.

DETAILED DESCRIPTION OF THE INVENTION

Figure 3:
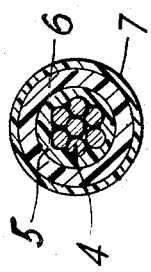
FIG. 3 is a cross sectional view of a typical power cable for testing in accordance with the principles of this invention.

As shown in FIG. 3, a power cable typically includes conductor 4, conductor shield layer 5, insulation layer 6, and insulation shield layer 7. Conductor 4 may include any number of strands of wire, or it may be a single solid strand. Insulation layer 6 may be any solid dielectric material (e.g., polyethylene or cross-linked polyethylene). Conductor shield layer 5 and insulation shield layer 7 are typically a semi-conducting material such as polyethylene mixed with carbon black. Although most power cables have both of shield layers 5 and 7, in certain applications either or both of these layers may be omitted.

In accordance with the principles of this invention, insulation layer 6 must be wetted with a liquid wetting agent, either from the inside or the outside or both. In time and when subjected to electrical stress, the shielding materials used are susceptible to penetration by liquids. Accordingly, insulation layer 6 can be wetted from the inside through conductor shield layer 5 by introducing the liquid wetting agent between the strands of conductor 4 (e.g., with a syringe), or if conductor 4 is a single solid strand, by removing the conductor strand and replacing it with the liquid wetting agent. If desired, one or more strands of conductor 4 may be removed to facilitate introduction of the test liquid. If conductor shield layer 5 is omitted, insulation layer 6 can be wetted directly from the inside using these same techniques. In cables having insulation shield layer 7, insulation layer 6 can be wetted from the outside through shield layer 7 by immersing the cable in the wetting agent. If insulation shield layer 7 is omitted, insulation layer 6 can be wetted directly from the outside by this same technique. In any event, it is the insulation which must be wetted in accordance with the principles of this invention, and it will be understood that the phrase "wetting the insulation" as used herein encompasses both wetting the insulation directly (as in the case of an unshielded insulation surface) or wetting the insulation through a shielding layer.

The method of this invention also requires the application of a high frequency, high voltage test signal across the wetted portion of insulation layer 6. In cables having both of shield layers 5 and 7, this can be accomplished by applying the test signal to conductor 4 and connecting shield layer 7 to ground or vice versa. In that event, the test signal is actually applied across insulation layer 6 between shield layers 5 and 7. If shield layer 5 is omitted, the inner electrode is conductor 4. If shield 7 is omitted, the cable sample can be immersed in any conducting liquid (e.g., water or the liquid wetting agent) to provide an outer electrode. It is also possible to replace conductor 4 and its shield by a conducting liquid. In any event, the same result is achieved, viz., the test signal is applied across the cable insulation. It will therefore be understood that all of these ways of applying the test signal across the insulation to be tested are within the scope of this invention.

Figure 1:
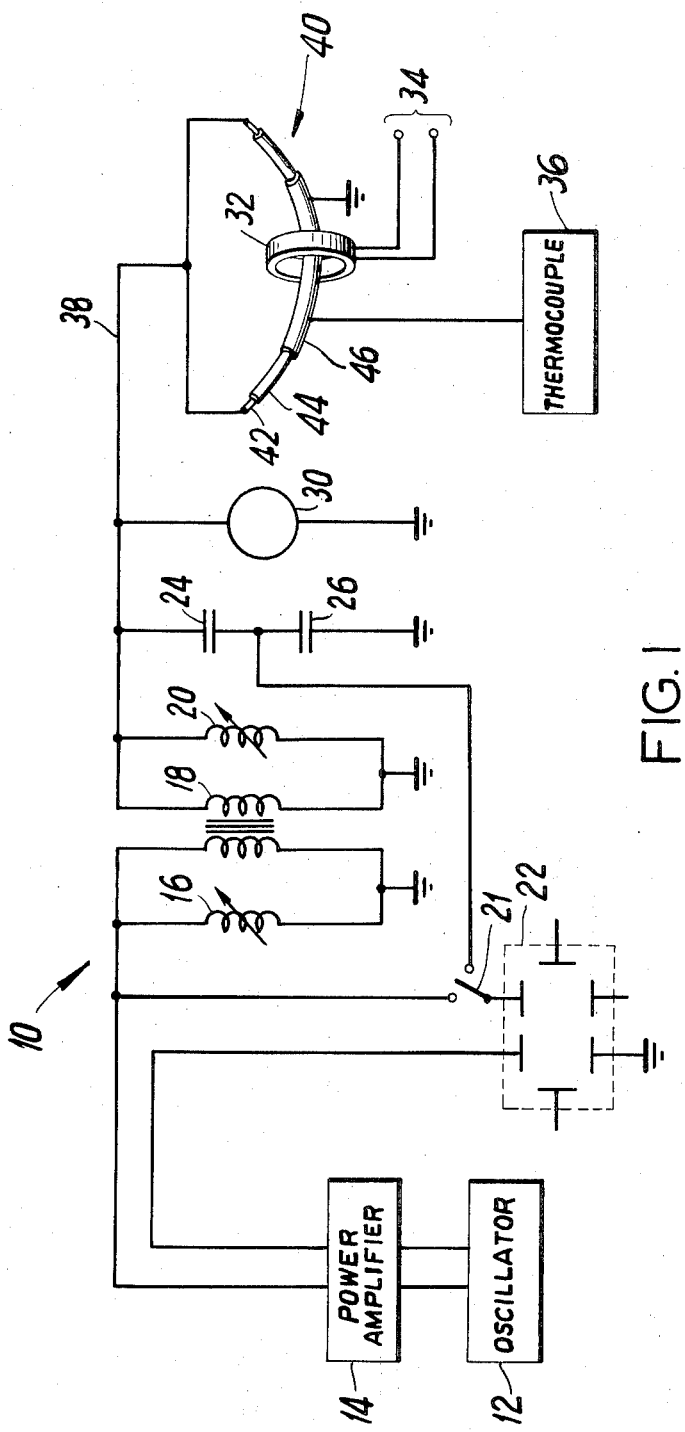
FIG. 1 is a partly schematic, partly perspective view of apparatus for carrying out the method of this invention to test a sample of shielded cable.

As shown in FIG. 1, apparatus for carrying out the cable test method of this invention includes high frequency, high voltage power supply 10 connected, for example, to the conductor of a sample 40 of cable to be tested. Power supply 10 includes an oscillator 12, a power amplifier 14, a compensating inductance coil 16, a high voltage transformer 18, a second adjustable high voltage coil 20, an oscilloscope 22 and associated circuitry for use in adjusting inductance coils 16 and 20, and an electrostatic voltmeter 30. If desired, the apparatus may also include an inductance heating coil 32 for inductively heating conductor 42 and therefore the entire cable sample during testing. Although shown around sample 40, coil 32 may be located at any point in the high voltage loop including conductor 42. Also included is a thermo-couple 36 for use in establishing the desired temperature of cable sample 40 (particularly the temperature of conductor 42). During application of the high frequency, high voltage test signal produced by power supply 10, thermo-couple 36 is disconnected from the cable sample. Of course, any other method of heating conductor 42 may also be employed. For example, the central portion of sample 40 may be immersed in a high temperature liquid bath. In that event, only one end of conductor 42 need be connected to power supply 10.

In operation, oscillator 12 produces a high frequency AC output signal (e.g., a signal having a frequency in the range from 400 Hz to 10 kHz) which is applied to power amplifier 14. Since it may be desirable to test cables at various frequencies and voltages, oscillator 12 and amplifier 14 and conveniently made adjustable. The amplified output signal of amplifier 14 is applied to the primary coil of high voltage transformer 18 which increases the voltage of this applied signal to at least the rated voltage of the cable to be tested (e.g., 15 kV for many power cables). The impedance of the circuit is adjusted by adjustment of one or both of variable inductance coils 16 and 20. Oscilloscope 22 is provided for use in adjusting these coils and may be connected to either side of transformer 18 by switch 21. When connected to the high voltage side of transformer 18 (i.e., the side of transformer 18 connected in parallel with coil 20), oscilloscope 22 is protected from the high voltage by capacitors 24 and 26 connected as shown. Coils 16 and 20 and the circuitry provided for use in adjusting them are, of course, not indispensible to circuit operation. Voltmeter 30 is provided for monitoring the voltage of the signal applied to the cable sample being tested. If included in the circuit, capacitors 24 and 26 form a voltage divider which can be used in conjunction with oscilloscope 22 to measure the applied voltage in lieu of voltmeter 30.

In FIG. 1 the cable being tested is a sample 40 of cable including stranded conductor 42, insulating layer 44, and insulation shield layer 46. In accordance with principles of this invention, the procedure for testing cable sample 40 is as follows: The cable sample is bent in a U-shape and the space between the strands of conductor 42 is filled with a selected liquid (e.g., by injecting the liquid between the conductor strands with a syringe), thereby wetting insulation 44 from the inside. Evaporation of the liquid may be prevented by sealing the ends of the cable sample, for example, with epoxy cement or a similar material. Conductor 42 is connected to high frequency, high voltage power supply 10 (adjusted to a selected frequency and voltage) by way of lead 38, and shield 46 is connected to ground. In this way the signal generated by power supply 10 is applied across insulation 44 between conductor 42 and shield 46. As mentioned above, power supply 10 is preferably adjusted to at least the rated voltage of the cable being tested and to any frequency substantially above the normal operating frequency of the cable. Since power cables typically operate at 60 Hz or below, frequencies above approximately 400 Hz may be employed. Best results have been obtained with frequencies in the range from 5 to 10 kHz applied at voltages between one and two times the rated voltage. In certain situation, voltages as high as five times the rated voltage may be used. Although trees may develop under these conditions in a matter of hours, the high frequency, high voltage test signal is typically applied to the cable sample for a period of several days or weeks. The expression "prolonged period of time" as used herein means a period of time substantially in excess of that employed in conventional break-down tests which is measurable in seconds. In the present invention the potential may be applied for a period measurable in hours or even days or weeks.

To further accelerate the development of trees, conductor 42 may be heated (e.g., by induction coil 32) to approximately the normal operating temperature of the cable (typically 70° to 90° C). This is not absolutely necessary, however, since it has been found that trees will develop even without elevating the temperature of conductor 42.

At the end of the test period, cable sample 40 is de-energized, removed from the test apparatus of FIG. 1, and examined for treeing (e.g., by microscopic examination of one or more cross sections of the sample). Since trees will develop in cables tested as described above in a matter of days or weeks, the method of this invention is considerably accelerated as compared to the months or years required for trees to develop to the same degree under normal field conditions.

Figure 2:
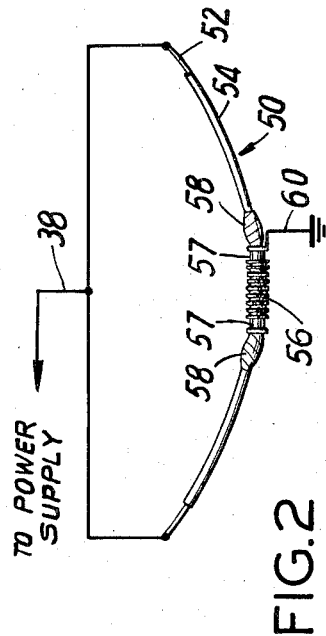
FIG. 2 shows how a part of the test apparatus of FIG. 1 may be modified to test a sample of shielded or unshielded cable.

Shielded or unshielded cables may also be tested in accordance with the principles of this invention as shown in FIG. 2. In the test apparatus shown in FIG. 2 a portion of unshielded cable sample 50 (including stranded conductor 52 and insulation 54) passes through flexible tubular container 56. Container 56 is sealed at both ends by seals 57 and contains a conducting test liquid, thereby wetting insulation 54 from the outside. If desired, insulation 54 may also be wetted from the inside, for example, by injecting the test liquid between the strands of conductor 52 as described above. Sample 50 may be provided with voltage stress relief cones 58 at the ends of container 56. Conductor 52 is connected to power supply 10 as in the test apparatus of FIG. 1 and the fluid in container 56 is connected to ground by way of lead 60. Thereby again applying the test signal generated by power supply 10 across the wetted insulation of the test sample. As in the apparatus shown in FIG. 1, the conductor of cable sample 50 may be heated inductively by a coil (not shown in FIG. 2) located at any point in the high voltage loop including conductor 52.

When the test apparatus of FIG. 2 is being used to test shielded cable, the insulation shield instead of the liquid in container 56 may be connected to ground. A nonconducting test liquid may then be used in container 56 if desired. Stress relief cones, if provided, are connected at the ends of the semi-conducting shield.

With regard to the choice of test liquid, it has been found that the higher the dipole of the liquid, the more suitable it is for the purpose of accelerated testing for treeing. One liquid which is particularly suitable for this purpose is ethylene glycol which has a dipole moment of 2.28. Water and other liquids and solutions having a dipole moment preferably greater than that of water (but at least greater than one) may also be used.

Several cable samples can be tested simultaneously using the method and apparatus of this invention by connecting the samples in series or in parallel or in a combination connection.

In accordance with the principles of this invention, the insulation does not necessarily have to be surrounding a center conductor. The insulating material could be tested in the form of a slab placed between two electrodes.

To illustrate the effectiveness of the present method, the results of several tests are summarized below. In a first series of tests, three samples of the same 15 kV polyethylene insulated cable having a tape-type conductor shield were prepared and tested as follows:

1. Space between conductor strands filled with ethylene glycol; heated to 80° C; insulation subjected to 15 kV, 60 Hz applied signal.
2. Conductor dry; heated to 80° C; insulation subjected to 15 kV, 7,300 Hz applied signal.
3. Space between conductor strands filled with ethylene glycol; heated to 70° C; insulation subjected to 15 kV, 8,200 Hz applied signal.

It will be noted that of these three samples, only the third was fully tested in accordance with the method of this invention. After 21 days on test, all three samples were de-energized and examined for treeing. Samples (1) and (2) did not exhibit any treeing, while sample (3) exhibited small trees resembling bow ties, broccoli, and strings.

In a second series of tests, six new (i.e., never energized) cables, having polyethylene insulation, some with tape-type and others with extruded shields, were subjected to similar test conditions (i.e., 15 kV, 7,300 Hz, 70°–80° C) for 39 days. Some of these six cables had Hostapal (a liquid commonly used for stress cracking tests) among their conductor strands, others were dry. After the 39 days under test, the cables were dissected and examined for trees. Two of the six cables showed trees. Both of these cables were among those tested with Hostapal among the conductor strands. One of the cables showing trees was a cable maintained in storage in excess of 8 years. Examination of the latter cable before testing did not disclose any alteration of the cable structure. Additional cable from the same manufacturing length had been installed and operated in the field for eight years. The trees which developed in the 39 day laboratory test were quite similar to those found in the cable in operation for 8 years.

In a third series of tests, water was injected among the strands of nine polyethylene and cross-linked polyethylene insulated 15 kV cables, all having aluminum conductors and extruded shields. These nine cables were all made by different manufacturers. The cables were subjected to a 7,000 Hz 15 kV applied signal and to conductor temperatures of 65° to 85° C. After 52 days, the cables were dissected and examined for treeing. Two of the nine cables exhibited trees from contaminants. The trees had an appearance similar (although somewhat larger in length) to trees developed over 17 years in a field-operated polyethylene cable.

What is claimed is:

1. An accelerated method of testing the insulation of an insulated conductor for susceptibility to treeing, said insulation having an inner annular surface adjacent to the conductor and an outer annular surface, said method comprising the steps of:

wetting at least a portion of at least one of said surfaces of the insulation of a sample of the insulated conductor with a predetermined wetting agent; and applying an alternating current electrical potential for a prolonged period of time across the insulation between the wetted surface portion and the adjacent portion of the other surface of the insulation, said alternating current potential having a voltage at least equal to the rated voltage of the insulated conductor and a frequency substantially higher than the normal operating frequency of the insulated conductor to provide an electrical stress on the insulation and promote a reaction involving the wetting agent and the insulation material to cause an accelerated development of electro-chemical trees in insulation susceptible to treeing.

2. The method defined in claim 1 wherein the conductor of the sample is maintained at approximately its normal operating temperature during said step of applying.

3. The method defined in claim 2 wherein the conductor is maintained at approximately its normal operating temperature by inductively heating the metal of the conductor.

4. The method defined in claim 1 wherein the conductor is maintained at a temperature in the range from 70° to 90° C during said step of applying.

5. The method defined in claim 1 wherein said wetting agent is a liquid having a dipole moment at least equal to one.

6. The method defined in claim 1 wherein the inner surface of the insulation is wetted by introducing the wetting agent into the insulated conductor inside the insulation.

7. The method defined in claim 1 wherein the conductor is a stranded conductor and the inner surface of the insulation is wetted by introducing the wetting agent between the strands of the conductor.

8. The method defined in claim 6 wherein the outer surface of the insulation is also wetted and wherein the alternating current electrical potential is applied across the insulation between adjacent wetted portions of the inner and outer surfaces.

9. The method defined in claim 1 wherein the insulated conductor further includes an annular conductive shield surrounding the insulation and wherein the alternating current electrical potential is applied between the conductor and the annular shield.

10. The method defined in claim 1 wherein the outer surface of the insulation is wetted and wherein the alternating current electrical potential is applied between the conductor and the wetted outer surface of the insulation.

11. The method defined in claim 1 wherein the voltage of said alternating current electrical potential is at least equal to the rated voltage of the insulated conductor.

12. The method defined in claim 1 wherein the voltage of said alternating current electrical potential is in the range from one to five time the rated voltage of the insulated conductor.

13. The method defined in claim 1 wherein the frequency of said alternating current electrical potential is at least 400 Hz.

14. The method defined in claim 1 wherein the frequency of said alternating current electrical potential is in the range from 5 kHz to 10 kHz.

15. The method of claim 1 wherein the sample is maintained in a U-shape while said alternating current electrical potential is being applied.

16. An accelerated method of testing the solid insulation of a stranded conductor power cable for susceptibility to gradual electro-chemical deterioration, said insulation having an inner annular surface adjacent to the conductor and an outer annular surface, said method comprising the steps of:
  introducing a liquid having a dipole moment at least as high as that of water into the strands of the conductor in a sample of the cable;
  heating the conductor of the sample to at least the normal operating temperature of the cable; and
  applying an alternating current electrical potential across the insulation of the sample for a prolonged period of time between the inner and outer surfaces of said insulation, said alternating current potential having a voltage at least equal to the rated voltage of the cable and a frequency of at least 400 Hz to provide an electrical stress on the insulation and promote a reaction involving the wetting agent and the insulation material to cause an accelerated development of electro-chemical trees in cables susceptible to electro-chemical deterioration.

17. The method defined in claim 16 wherein said alternating current electrical potential has a voltage in the range from one to five times the rated voltage of the cable.

18. The method defined in claim 17 wherein said alternating current electrical potential has a frequency in the range from 5 to 10 kHz.

19. The method defined in claim 18 wherein the conductor is heated to a temperature in the range from 70° to 90° C.

20. The method defined in claim 19 wherein the conductor is heated by inductive heating of the conductor metal.

21. The method defined in claim 20 wherein the sample is maintained in a U-shape during said step of applying.

22. The method defined in claim 16 wherein at least a portion of the exterior of the sample is immersed in said liquid during said step of applying.

23. The method defined in claim 22 wherein said alternating current electrical potential is applied between the conductor of the sample and the liquid in which the exterior of the sample is immersed.

24. The method defined in claim 23 wherein the sample is maintained in a U-shape during said step of applying.

25. The method defined in claim 16 wherein said cable further includes a conductive shield surrounding the outer surface of the insulation and wherein said alternating current electrical potential is applied between the conductor of the sample and the shield.

26. The method defined in claim 25 wherein at least a portion of the exterior of the sample is immersed in said liquid during said step of applying.

27. The method defined in claim 26 wherein the sample is maintained in a U-shape during said step of applying.

* * * * *

Dedication 3,821,640.—*George Bahder*, Suffern, and *Carlos Katz*, Spring Valley, N.Y. METHOD AND APPARATUS FOR ACCELERATED TESTING OF POWER CABLE INSULATION FOR SUSCEPTIBILITY TO TREEING. Patent dated June 28, 1974. Dedication filed Aug. 20, 1975, by the assignee, *Phelps Dodge Industries, Inc.*

Hereby dedicates the entire remaining term of said patent to the Public.
[*Official Gazette December 16, 1975.*]